US012627562B2

(12) United States Patent
Veeramachaneni et al.

(10) Patent No.: US 12,627,562 B2
(45) Date of Patent: May 12, 2026

(54) METHOD AND SYSTEM FOR EXPANDING CLIENT NETWORKS WHILE IMPROVING AND PROTECTING ROBUSTNESS OF THE CLIENT NETWORKS

(71) Applicant: JPMorgan Chase Bank, N.A., New York, NY (US)

(72) Inventors: Krishna Rao Veeramachaneni, Hyderabad (IN); Sudhir Gorripati, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 79 days.

(21) Appl. No.: 18/652,324

(22) Filed: May 1, 2024

(65) Prior Publication Data

US 2025/0300888 A1     Sep. 25, 2025

(30) Foreign Application Priority Data

Mar. 19, 2024    (IN) .............................. 202411020403

(51) Int. Cl.
| | |
|---|---|
| *G06F 15/177* | (2006.01) |
| *G06F 16/903* | (2019.01) |
| *H04L 41/0816* | (2022.01) |
| *H04L 41/0823* | (2022.01) |
| *H04L 41/12* | (2022.01) |
| *H04L 41/16* | (2022.01) |

(52) U.S. Cl.
CPC ........ *H04L 41/0836* (2013.01); *G06F 16/903* (2019.01); *H04L 41/0816* (2013.01); *H04L 41/12* (2013.01); *H04L 41/16* (2013.01)

(58) Field of Classification Search
CPC ...................................................... H04L 41/16
See application file for complete search history.

(56) References Cited

U.S. PATENT DOCUMENTS

| | | | | |
|---|---|---|---|---|
| 9,319,419 B2 * | 4/2016 | Sprague | ................ | H04L 63/107 |
| 2022/0067738 A1 * | 3/2022 | Fang | .................... | G06Q 20/389 |
| 2023/0244769 A1 * | 8/2023 | Wallach | ............... | G06V 40/172 |
| | | | | 726/2 |

* cited by examiner

*Primary Examiner* — Padma Mundur
(74) *Attorney, Agent, or Firm* — Greenblum & Bernstein, P.L.C.

(57) ABSTRACT

A client network expansion system that: converts at least one from among a first rule and a first trend into a first set of code; stores the first set of code within a first repository of strategies; receives a first request that is associated with a new set of client details; based on the first repository of strategies, transforms a new set of client details into at least one new quantification of a first set of client attributes; determines whether the at least one new quantification meets a first set of criteria for a first client network; and adds a new client to the first client network when the determination is made that the at least one new quantification meets the first set of criteria.

20 Claims, 5 Drawing Sheets

<u>400</u>

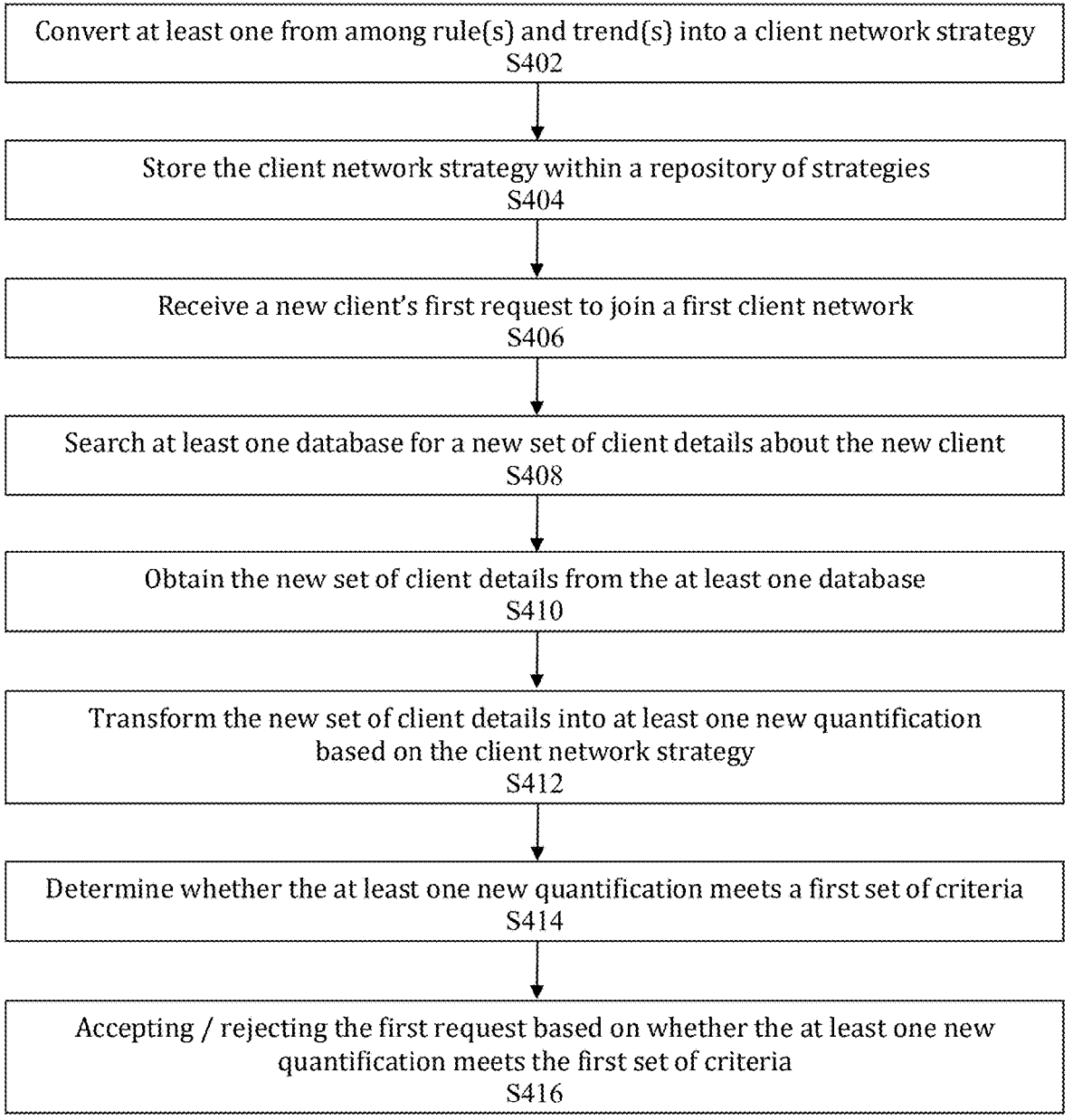

Convert at least one from among rule(s) and trend(s) into a client network strategy
S402

Store the client network strategy within a repository of strategies
S404

Receive a new client's first request to join a first client network
S406

Search at least one database for a new set of client details about the new client
S408

Obtain the new set of client details from the at least one database
S410

Transform the new set of client details into at least one new quantification
based on the client network strategy
S412

Determine whether the at least one new quantification meets a first set of criteria
S414

Accepting / rejecting the first request based on whether the at least one new
quantification meets the first set of criteria
S416

METHOD AND SYSTEM FOR EXPANDING CLIENT NETWORKS WHILE IMPROVING AND PROTECTING ROBUSTNESS OF THE CLIENT NETWORKS

CROSS-REFERENCE TO RELATED APPLICATIONS

This application claims priority benefit from Indian Application No. 202411020403, filed Mar. 19, 2024, which is hereby incorporated by reference in its entirety.

BACKGROUND

1. Field of the Invention

The field of the invention disclosed herein generally relates to a client network expansion tool and, more particularly, to a method, system, and computer-readable medium for implementing technology that expands at least one client network, improves the at least one client network's robustness, and simultaneously protects that robustness from being diminished.

2. Background of the Invention

Currently, there is a need for technology that can identify strategies for reliably expanding a client network and can also identify factors impacting the client network's robustness. As part of initiatives to expand the clientele of a resource network, such as a distributed resource network that provides services via the Internet, it is necessary to identify dynamic business strategies and any attributes that impact the network's strength, especially when that network's strength depends on the integrity of its clients.

However, there is currently no technology available for identifying dynamic business strategies or attributes that impact a network's strength. Therefore, conventional resource network clientele expansion initiatives are prone to inconsistencies and other types of errors due to an absence of relevant resources to this end.

Accordingly, there is a need in the field of the herein-disclosed invention for a technical solution to the foregoing absence of technology for identifying dynamic business strategies and attributes that impact a network's strength.

SUMMARY

The present disclosure, through one or more of its various aspects, embodiments, and/or specific features or sub-component, provides, inter alia, various systems, servers, devices, methods, media, programs and platforms for implementing a client network expansion tool that expands at least one client network and improves the at least one client network's robustness while simultaneously protecting that robustness from being diminished.

According to an aspect of the present disclosure, a method is provided for implementing a client network expansion tool. The method may comprise: converting at least one from among a first rule and a first trend into a first set of code that comprises at least a first corresponding programmatic client network strategy; storing the first corresponding programmatic strategy within a first repository of strategies for a first client network that receives a first set of services from a first set of servers; receiving, from a new client, a first request to join the first client network; based on the first repository of strategies, transforming a new set of client details that correspond to the new client, into at least one new quantification of a first set of client attributes; determining whether the at least one new quantification meets a first set of criteria for the first client network; and adding the new client to the first client network when a determination is made that the at least one new quantification meets the first set of criteria. The first client network may include at least one client device, and the first request may be associated with the new set of client details.

In the method, after the adding the new client to the first client network, the method may further comprise: permitting, by the adding, the first set of servers to provide the first set of services to the new client; and improving, by the adding, a robustness of the first client network.

In the method, when a determination is made that at least one new quantification does not meet the first set of criteria, the method may further comprise: rejecting the first request; preventing, by the rejecting, the first set of servers from providing the first set of services to the new client; and protecting, by the rejecting, a robustness of the first client network from being diminished.

The method may further comprise: searching a set of databases for at least one from among at least one attribute value of the new client and at least one parameter value of the new client; and obtaining, from the set of databases, results of the searching; and associating the new set of client details with the new client. The new set of client details may comprise the results of the searching.

In the method, the set of databases may comprise at least one from among a government database and a database of an external agency.

In the method, the transforming may comprise utilizing an algorithm to transform the new set of client details into the at least one new quantification.

The method may further comprise: receiving a second request; based on a second repository of strategies, transforming a second set of client details into at least one second quantification; determining whether the at least one second quantification meets a second set of criteria for a second client network that receives a second set of services from a second set of servers; and granting the second request when a determination is made that the at least one second quantification meets the second set of criteria. The second request may be associated with the second set of client details, the second request may comprise a request to join the second client network, and the at least one second quantification may comprise at least one quantification of a second set of client attributes.

In the method, the transforming and the determining may be performed by at least one first artificial intelligence and machine learning (AI/ML) model that comprises at least one from among at least one explainable AI/ML model and at least one distance metric learning AI/ML model.

In the method, the at least one explainable AI/ML model may identify a first set of contributing factors that cause the at least one first AI/ML model to transform the new set of client details into the at least one new quantification.

In the method, the at least one distance metric learning AI/ML model may be based on at least one from among a large margin nearest neighbor metric learning (LMNN) algorithm and a neighborhood components analysis (NCA) algorithm.

According to another aspect of the present disclosure, a system is provided for implementing a client network expansion tool. The system may comprise a processor and memory storing instructions that cause the processor to perform operations when the instructions are executed by the processor. The operations may comprise: converting at least one from among a first rule and a first trend into a first set of code that comprises at least a first corresponding programmatic client network strategy; storing the first corresponding programmatic strategy within a first repository of strategies for a first client network that receives a first set of services from a first set of servers; receiving, from a new client, a first request to join the first client network; based on the first repository of strategies, transforming a new set of client details that correspond to the new client into at least one new quantification of a first set of client attributes; determining whether the at least one new quantification meets a first set of criteria for the first client network; and adding the new client to the first client network when a determination is made that the at least one new quantification meets the first set of criteria. The first client network include at least one client device, and the first request may be associated with the new set of client details.

In the system, after the processor adds the new client to the first client network, the instructions may cause the processor to perform further operations. The further operations may comprise: permitting, by the adding, the first set of servers to provide the first set of services to the new client; and improving, by the adding, a robustness of the first client network.

In the system, when the processor determines that the at least one new quantification does not meet the first set of criteria, the instructions may cause the processor to perform further operations. The further operations may comprise: rejecting the first request; preventing, by the rejecting, the first set of servers from providing the first set of services to the new client; and protecting, by the rejecting, a robustness of the first client network from being diminished.

In the system, the instructions may cause the processor to perform further operations. The further operations may comprise: searching a set of databases for at least one from among at least one attribute value of the new client and at least one parameter value of the new client; obtaining, from the set of databases, results of the searching; and associating the new set of client details with the new client. The new set of client details may comprise the results of the searching.

In the system, the set of databases may comprises at least one from among a government database and a database of an external agency.

In the system, when executed by the processor, the instructions may cause the transforming to comprise utilizing an algorithm to transform the new set of client details into the at least one new quantification.

In the system, the instructions may cause the processor to perform further operations. The further operations may comprise receiving a second request; based on a second repository of strategies, transforming a second set of client details into at least one second quantification; determining whether the at least one second quantification meets a second set of criteria for the second client network; and granting the second request when a determination is made that the at least one second quantification meets the second set of criteria. The second request may be associated with the second set of client details, the second request may comprise a request to join a second client network that receives a second set of services from a second set of servers, and the at least one second quantification may comprise at least one quantification of a second set of client attributes.

In the system, when executed by the processor, the instructions may cause the transforming and the determining to be performed by at least one first AI/ML model that comprises at least one from among at least one explainable AI/ML model and at least one distance metric learning AI/ML model.

In the system, when executed by the processor, the instructions may cause the at least one explainable AI/ML model to identify a first set of contributing factors that cause the at least one first AI/ML model to transform the new set of client details into the at least one new quantification.

In the system, when the instructions are executed by the processor, the at least one distance metric learning AI/ML model may be based on at least one from among an LMNN algorithm and an NCA algorithm.

According to yet another aspect of the present disclosure, a non-transitory computer-readable medium is provided for implementing a client network expansion tool. The computer-readable medium may store instructions that, when executed by a processor, cause the processor to perform operations. The operations may comprise: converting at least one from among a first rule and a first trend into a first set of code that comprises at least a first corresponding programmatic client network strategy; storing the first corresponding programmatic strategy within a first repository of strategies for a first client network that receives a first set of services from a first set of servers; receiving, from a new client, a first request to join the first client network; based on the first repository of strategies, transforming a new set of client details into at least one new quantification of a first set of client attributes; determining whether the at least one new quantification meets a first set of criteria for the first client network; and adding the new client to the first client network when a determination is made that the at least one new quantification meets the first set of criteria. The first client network may include at least one client device, the first request may be associated with a new set of client details that correspond to the new client.

In the computer-readable medium, after the adding the new client to the first client network, the instructions may cause the processor to perform further operations. The further operations may comprise: permitting, by the adding, the first set of servers to provide the first set of services to the new client; and improving, by the adding, a robustness of the first client network.

In the computer-readable medium, when a determination is made that the at least one new quantification does not meet the first set of criteria, the instructions may cause the processor to perform further operations. The further operations may comprise: rejecting the first request; preventing, by the rejecting, the first set of servers from providing the first set of services to the new client; and protecting, by the rejecting, a robustness of the first client network from being diminished.

In the computer-readable medium, the instructions may cause the processor to perform further operations. The further operations may comprise: searching a set of databases for at least one from among at least one attribute value of the new client and at least one parameter value of the new client; obtaining, from the set of databases, results of the searching; and associating the new set of client details with the new client. The new set of client details may comprise the results of the searching.

In the computer-readable medium, the set of databases may comprise at least one from among a government database and a database of an external agency.

In the computer-readable medium, when executed by the processor, the instructions cause the transforming to comprise utilizing an algorithm to transform the new set of client details into the at least one new quantification.

In the computer-readable medium, the instructions may cause the processor to perform further operations that may comprise: receiving a second request; based on a second repository of strategies, transforming a second set of client details into at least one second quantification; determining whether the at least one second quantification meets a second set of criteria for the second client network; and granting the second request when a determination is made that the at least one second quantification meets the second set of criteria. The second request may be associated with the second set of client details, the second request may comprise a request to join a second client network that receives a second set of services from a second set of servers, and the at least one second quantification may comprise at least one quantification of a second set of client attributes.

In the computer-readable medium, when executed by the processor, the instructions may cause the transforming and the determining to be performed by at least one first AI/ML model that comprises at least one from among at least one explainable AI/ML model and at least one distance metric learning AI/ML model.

In the computer-readable medium, when executed by the processor, the instructions may cause the at least one explainable AI/ML model to identify a first set of contributing factors that cause the at least one first AI/ML model to transform the new set of client details into the at least one new quantification.

In the computer-readable medium, when the instructions are executed by the processor, the at least one distance metric learning AI/ML model may be based on at least one from among an LMNN algorithm and an NCA algorithm.

Thereby, the invention disclosed herein provides a new approach to client network expansion that not only expands at least one client network, but also improves such a client network's robustness while simultaneously protecting that robustness from being diminished by a client of poor integrity.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 depicts a flowchart of an exemplary process for expanding at least one client network.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
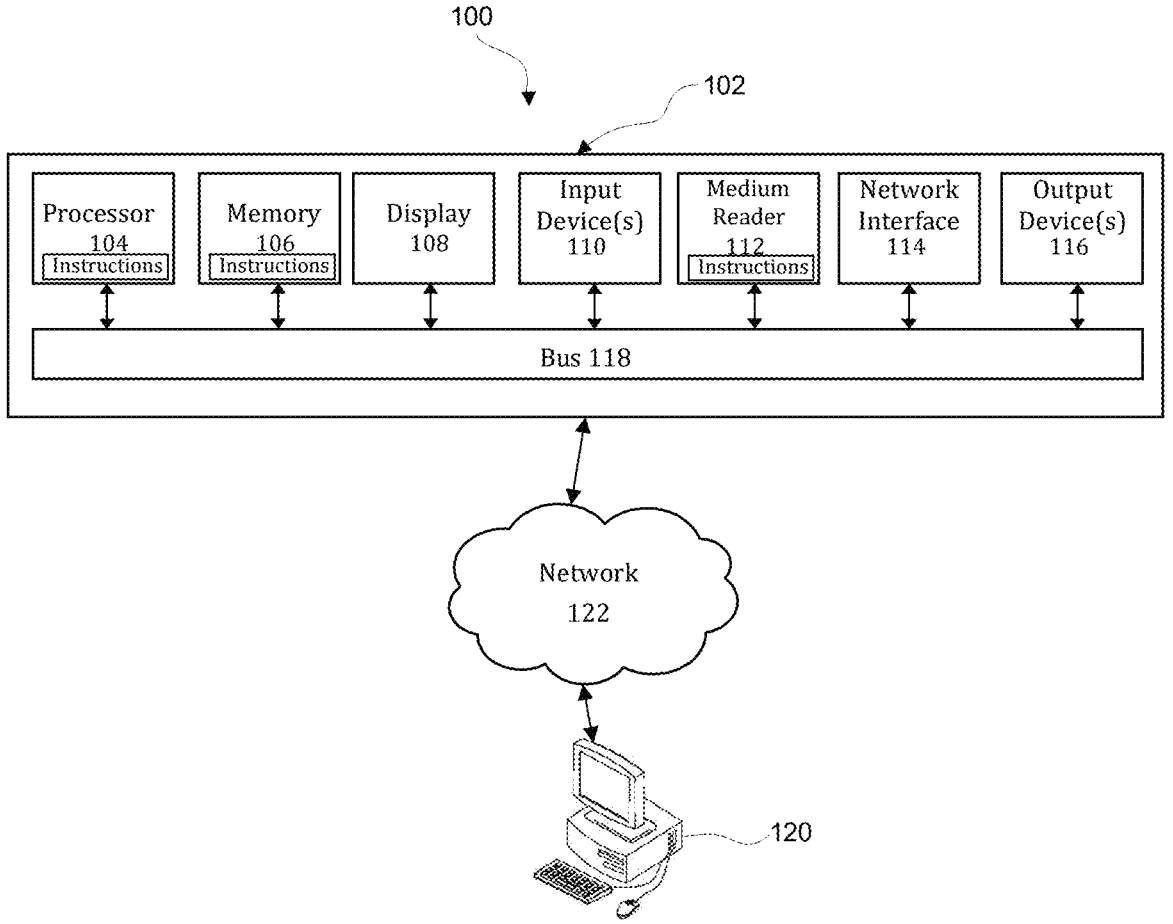
FIG. 1 depicts a diagram of an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for longer than a transitory period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide methods and systems for implementing a client network expansion tool that not only expands at least one client network, but also improves such a client network's robustness while simultaneously protecting that robustness from being diminished.

Figure 2:
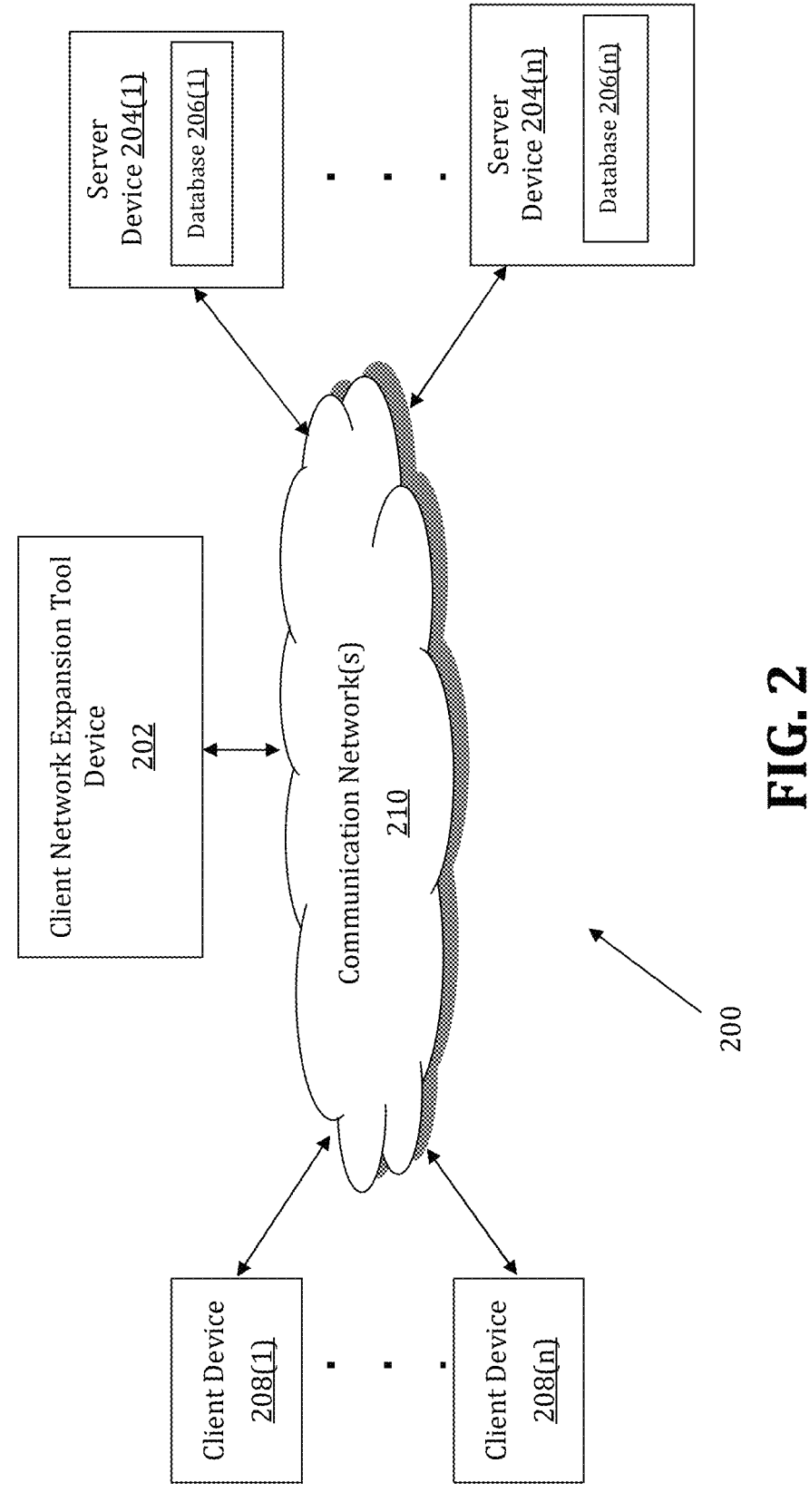
FIG. 2 depicts a diagram of an exemplary network environment for expanding a client network.

Referring to FIG. 2, a schematic of an exemplary network environment 200 for expanding a client network. In an exemplary embodiment, a client network expansion tool may be implemented on any networked computer platform, such as, for example, a personal computer (PC).

A method for implementing a tool that expands at least one client network, may be implemented by a client network expansion tool (CNET) device 202. The CNET device 202 may be the same or similar to the computer system 102 as described with respect to FIG. 1. The CNET device 202 may be a rack-mounted server in a datacenter, an embedded microcontroller (MCU) in an electronic device, or another type of headless system, which is a computer system or device that is configured to operate without a monitor, keyboard and mouse. The CNET device 202 may store one or more applications that can include executable instructions that, when executed by the CNET device 202, cause the CNET device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CNET device 202 itself, may be located in virtual server(s) running in a cloud-based computing environment rather than being tied to one or more specific physical network computing devices. Also, the application(s) may be running in one or more virtual machines (VMs) executing on the CNET device 202. Additionally, in one or more embodiments of this technology, virtual machine(s) running on the CNET device 202 may be managed or supervised by a hypervisor.

In the network environment 200 of FIG. 2, the CNET device 202 is coupled to a plurality of server devices 204(1)-204(n) that hosts a plurality of databases 206(1)-206 (n), and also to a plurality of client devices 208(1)-208(n) via communication network(s) 210. A communication interface of the CNET device 202, such as the network interface 114 of the computer system 102 of FIG. 1, operatively couples and communicates between the CNET device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CNET device 202, the server devices 204 (1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, computer readable media, and CNET devices that implement a method for a client network expansion tool that improves at least one client network's robustness while simultaneously protecting that robustness from being diminished.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CNET device 202 may be a standalone device or integrated with one or more other devices or apparatuses, such as one or more of the server devices 204(1)-204(n), for example. In one particular example, the CNET device 202 may include or be hosted by one of the server devices 204(1)-204(n), and other arrangements are also possible. As another example, the CNET device 202 may be integrated with one or more other devices or apparatuses, such as one or more of the client devices 208(1)-208(n). Moreover, one or more of the devices of the CNET device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, memories and communication interfaces, which are coupled together by at least one bus or other communication link, although other numbers and/or types of network devices may be used. The server devices 204(1)-204(n) in this example may process requests received from the CNET device 202 via the communication network(s) 210 according to an HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store data that relates to a variety of databases.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the CNET device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CNET device 202 via the communication network(s) 210 in order to communicate user requests and other information. The client devices 208(1)-208(n) may further include, among other features, a display device, such as a display screen or touchscreen, and/or an input device, such as a keyboard, for example.

Although the exemplary network environment 200 with the CNET device 202, the server devices 204(1)-204(n), the databases 206(1)-206(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CNET device 202, the server devices 204(1)-204(n), the databases 206(1)-206(n), or the client devices 208(1)-208(n), for example, may be configured to operate as virtual instances on the same physical machine. In other words, one or more of the CNET device 202, the server devices 204(1)-204(n), the databases 206(1)- 206(n), or the client devices 208(1)-208(n) may operate on the same physical device rather than as separate devices communicating through communication network(s) 210. Additionally, there may be more or fewer server devices 204(1)-204(n), databases 206(1)-206(n), or client devices 208(1)-208(n) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
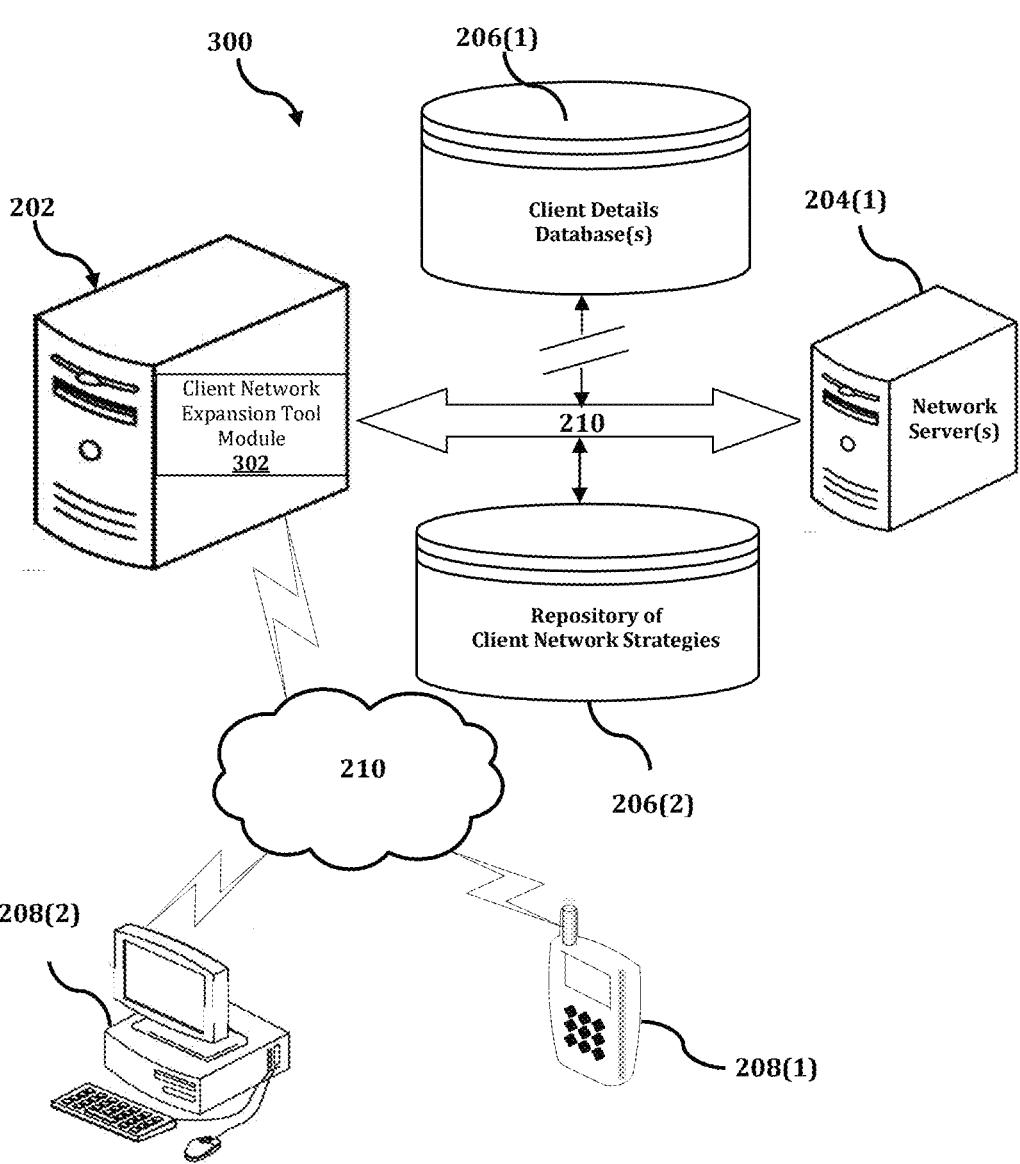
FIG. 3 depicts a diagram of an exemplary perspective of a network environment that is undergoing client network expansion.

The CNET device 202 is described and illustrated in FIG. 3 as including client network expansion tool module 302, although it may include other rules, policies, modules, databases, or applications, for example. As will be described below, client network expansion tool module 302 is configured to not only expand at least one client network, but also to improve such a client network's robustness while simultaneously protecting that robustness from being diminished. Client network expansion tool module 302 may include software that is based on a microservices architecture.

Client network expansion tool module 302 may be integrated with one or more devices or apparatuses, such as client devices 208(1)-208(n), where client network expansion tool module 302 may be implemented as an application or as an addon or plugin to another application of the one or more devices or apparatuses, and where client network expansion tool module 302 may execute in the background.

An exemplary process 300 for application of a client network expansion tool to an aspect of the network environment of FIG. 2 is illustrated as being executed in FIG. 3. Specifically, a first client device 208(1) and a second client device 208(2) are illustrated as being in communication with CNET device 202. In this regard, the first client device 208(1) and the second client device 208(2) may be "clients" of the CNET device 202 and are described herein as such. Nevertheless, it is to be known and understood that the first client device 208(1) and/or the second client device 208(2) need not necessarily be "clients" of the CNET device 202, or any entity described in association therewith herein. Any additional or alternative relationship may exist between either or both of first client device 208(1), second client device 208(2) and CNET device 202, or no relationship may exist.

Further, CNET device 202 is illustrated as being able to access client details database(s) 206(1), and repository of client network strategies 206(2). CNET device 202 may comprise client network expansion tool module 302, which communicates with client details database(s) 206(1). In addition, client network expansion tool module 302 of CNET device 202 may also communicate with repository of client network strategies 206(2). Client network expansion tool module 302 may be configured to provide a dynamically customizable interface for expanding at least one client network.

Moreover, CNET device 202 may receive and transmit data via communication network(s) 210. CNET device 202 may receive and transmit data such as code that is written in one or more of the following dialects: transaction control language (TCL), data manipulation language (DML), data control language (DCL) and data definition language (DFL). Additionally, via communication network(s) 210, CNET device 202 may respectively receive and transmit data from and to one or more from among the following devices: server device 204, client details database(s) 206(1), repository of client network strategies 206(2) (or another database 206), first client device 208(1), the second client device 208(2), and communication network(s) 210, for example.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(*n*) may represent, for example, computer systems of an organization's client network. The first client device 208(1) may represent, for example, one or more computer systems of a client or of a cluster of clients within the organization or client network. Of course, the first client device 208(1) may include one or more of any of the devices described herein. The second client device 208(2) may be, for example, one or more computer systems of another client or cluster of clients within the organization or client network. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the CNET device 202 via broadband or cellular communication. Of course, these embodiments are merely exemplary and are not limiting or exhaustive.

Client network expansion tool module 302 provides a strategy-based programmatic approach to client network expansion that improves at least one client network's robustness while simultaneously protecting that robustness from being diminished.

Client network expansion tool module 302 may execute a process that expands at least one client network and improves the at least one client network's robustness while simultaneously protecting the robustness from being diminished. An exemplary process for a client network expansion tool is generally indicated at flowchart 400 in FIG. 4.

In process 400 of FIG. 4, at step S402, client network expansion tool module 302 converts at least one from among a first rule and a first trend into a first set of code that comprises at least a first corresponding programmatic client network strategy.

At step S404, client network expansion tool module 302 stores the first corresponding programmatic strategy within a first repository of strategies, such as repository of client network strategies 206(2), for a first client network that receives a first set of services from a first set of servers, such as network server(s) 204(1). In an embodiment, the first client network may include at least one client device, such as client device 208(1) or client device 208(2), for example.

At step S406, client network expansion tool module 302 receives, from a new client, a first request to join the first client network. In an embodiment, client network expansion tool module 302 receives the first request from at least one client device, such as client device 208(1) or client device 208(2), for example.

At step S408, client network expansion tool module 302 searches a first set of databases for at least one from among at least one attribute value of the new client and at least one parameter value of the new client.

In an embodiment, the first set of databases may include one or more databases that store client details, such as client details database(s) 206(1) for example, and an integrity of the new client may be indicated by the at least one from among the at least one attribute value and the at least one parameter value. In an exemplary embodiment, the set of databases comprises a government database and/or a database of an external agency or organization.

At step S410, client network expansion tool module 302 obtains a new set of client details that includes results of the search from the first set of databases, and after step S410, client network expansion tool module 302 associates the new set of client details with the new client. In an embodiment, client network expansion tool module 302 may utilize at least one from among mapping and colocation to associate the new set of client details with the new client.

In an exemplary embodiment, after step S412, client network expansion tool module 302 may associate by storing a first identification that identifies the new set of client details in a first memory location that corresponds to a second memory location that stores a second identification that identifies the new client. Alternatively, after step S412, client network expansion tool module 302 may associate by mapping an original memory location of the new set of client details to the second memory location.

At step S412, client network expansion tool module 302 transforms, based on the first repository of strategies, the new set of client details into at least one new quantification of a first set of client attributes. In an embodiment, client network expansion tool module 302 utilizes an algorithm to transform the new set of client details into the at least one new quantification as described below in further detail.

In an exemplary embodiment, the algorithm utilized by client network expansion tool module 302 may be performed by an artificial intelligence and machine learning (AI/ML) model. In a further embodiment, the AI/ML model may comprise at least one explainable AI/ML model that identifies a first set of contributing factors that cause the at least one first AI/ML model to transform the new set of client details into the at least one new quantification.

In an additional or alternative embodiment, the AI/ML model may comprise one or more from among at least one distance metric learning AI/ML model and an AI/ML algorithm that is based on at least one from among a large margin nearest neighbor metric learning (LMNN) algorithm and a neighborhood components analysis (NCA) algorithm.

At step S414, client network expansion tool module 302 determines whether the at least one new quantification meets a first set of criteria for the first client network and, at step S416, client network expansion tool module 302 either rejects the first request or adds the new client to the first client network based on the determination of step S414.

In an embodiment, based on the determination of step S414, client network expansion tool module 302 adds the new client to the first client network at step S416 and, thereby, client network expansion tool module 302 strengthens the first client network by making it more robust due to a new client integrity that exceeds the first set of criteria. Hence, in this embodiment, at step S416, client network expansion tool module 302 improves the first client network's robustness by adding the new client to the first client network and, thereby, permitting the first set of servers to provide the first set of services to the new client. The at least one new quantification includes the new client integrity.

In another embodiment, based on the determination of step S414, client network expansion tool module 302 rejects the first request at step S416, and thereby protects the first client network's strength (e.g., robustness) from being diminished by the new client's integrity. Hence, in this embodiment, at step S416, client network expansion tool module 302 protects the first client network's strength by rejecting the first request and, thereby, preventing the first set of servers from providing the first set of services to the new client.

In an embodiment, after step S416, client network expansion tool module 302 may repeat process 400 for a second request, which may be from either from among the new client and a second new client. In the embodiment, the second request may include a request to join a second client network that receives a second set of services from a second set of servers. Indeed, client network expansion tool module 302 may repeat process 400 indefinitely by performing process 400 for every authentic client request to join a new client network.

Thereby, the framework presented herein offers an innovative technological approach to a client network's expansion while preserving the client network's strength or robustness and while protecting that robustness from being diminished.

In an embodiment, the algorithm utilized by client network expansion tool module 302 may comprise the following loss function:

$$\min_{L} \sum_{i,j} \eta_{ij} \|L(x_i - x_j)\|^2 + c \sum_{i,j,l} \eta_{ij} (1 - y_{ij}) \left[ 1 + \|L(x_i - x_j)\|^2 - \|L(x_i - x_l)\|^2 \right]_+)$$

In a further embodiment, at least one large margin nearest neighbor (LMNN) metric learning AI/ML model may utilize this loss function to transform details about a client into one or more respective quantifications of one or more corresponding attributes of that client.

In an additional or alternative embodiment, the algorithm utilized by client network expansion tool module 302 may comprise the following loss function:

$$p_{ij} = \frac{\exp\left(-\|Lx_i - Lx_j\|_2^2\right)}{\sum_{l \neq i} \exp\left(-\|Lx_i - Lx_j\|_2^2\right)}, \; p_{ii} = 0$$

For example, this loss function may be utilized by at least one neighborhood components analysis (NCA) AI/ML model to transform details about clients into one or more respective quantifications of one or more corresponding attributes of such clients.

It should be noted that the embodiments presented herein are not mutually exclusive from one another. Rather, client network expansion tool module 302 may be configured according to any one or more (or even all) of the herein-presented embodiments or combination thereof.

In embodiments of the framework presented herein, an artificial intelligence-based engine may be utilized to identify at least one anomaly request created from a rules engine's output data, which provides a programmatic strategist (such as a CNET) with an anomaly strength score for each request along with information on which attributes (if any) of a corresponding requestor provide an indication of an anomaly.

In such embodiments, the herein-presented framework may be further configured for interoperability with other modules, applications, processors and/or servers that complement and/or laterally improve the framework providing it with at least one from among improved and added functionality. Such embodiments may employ a customized dashboard for integration with a tool that tracks client network activities and details.

In an exemplary embodiment, an exemplary client request may comprise client parameters, which each comprise a corresponding quantification of each respective client parameter, and the artificial intelligence-based engine may process these client parameters and calculate an "Anomaly Strength Score" along with each respective client parameter's contribution to the score, which may be utilized by a programmatic strategist (e.g., CNET) to gain insight into the exemplary client request and/or its requestor.

In a further exemplary embodiment, an Anomaly Strength Score may signify the artificial intelligence-based engine's confidence in a corresponding prediction that the exemplary client request is an anomaly or otherwise unusually generated request. For example, a client may send a request to join a client network, the client's request may then be assessed by a rules engine, and the rules engine's output may be passed to a corresponding AI/ML model along with other preprocessed data. Thereby, in such an example, the corresponding AI/ML model may utilize the rules engine's output and other preprocessed data to generate an anomaly score and its corresponding contributing factors (or anomaly indicators).

The framework presented herein may comprise a variety of one or more corresponding AI/ML models. In an embodiment, the one or more corresponding AI/ML models may employ at least one from among distance metric learning (e.g., NCA), deep clustering algorithms (such as autoencoders, t-distributed Stochastic Neighbor Embedding or t-SNE algorithms, etc.), and ensemble learning (which may employ one or more from among an isolation forest algorithm, a random forest algorithm, etc.) for example. A synopsis of a couple features from a few of these approaches are set forth in the following exemplary comparison matrix table 1.

TABLE 1

| | Distance Metric Learning (NCA) Model | Deep Clustering (Autoencoders + t-SNE) | Ensemble Learning (Isolation Forest + Random Forest) |
| --- | --- | --- | --- |
| Description | Computes similarity score to know anomaly strength of input data point. | Separates input data into categories based on similarity among the data points. | Identifies rules and feature contribution using tree-based model |
| Computation time | 677 milliseconds (train) 25 milliseconds (test) | 25 seconds (train) 12 second (test) | 50 milliseconds(train) 37 milliseconds (test) |
| Accuracy Limitation (Restriction Bias) | 90.5% Retraining is computationally expensive. | 83% Computationally expensive Difficult to deploy due to customized clustering layer | 82-85% Can be more complex and computationally intensive compared to individual models |

In preferred embodiments, the framework presented herein utilizes a neighborhood components analysis distance metric learning algorithm to obtain faster and more accurate results (as set forth in Table 1) from at least one of the framework's corresponding AI/ML models.

Figure 5:
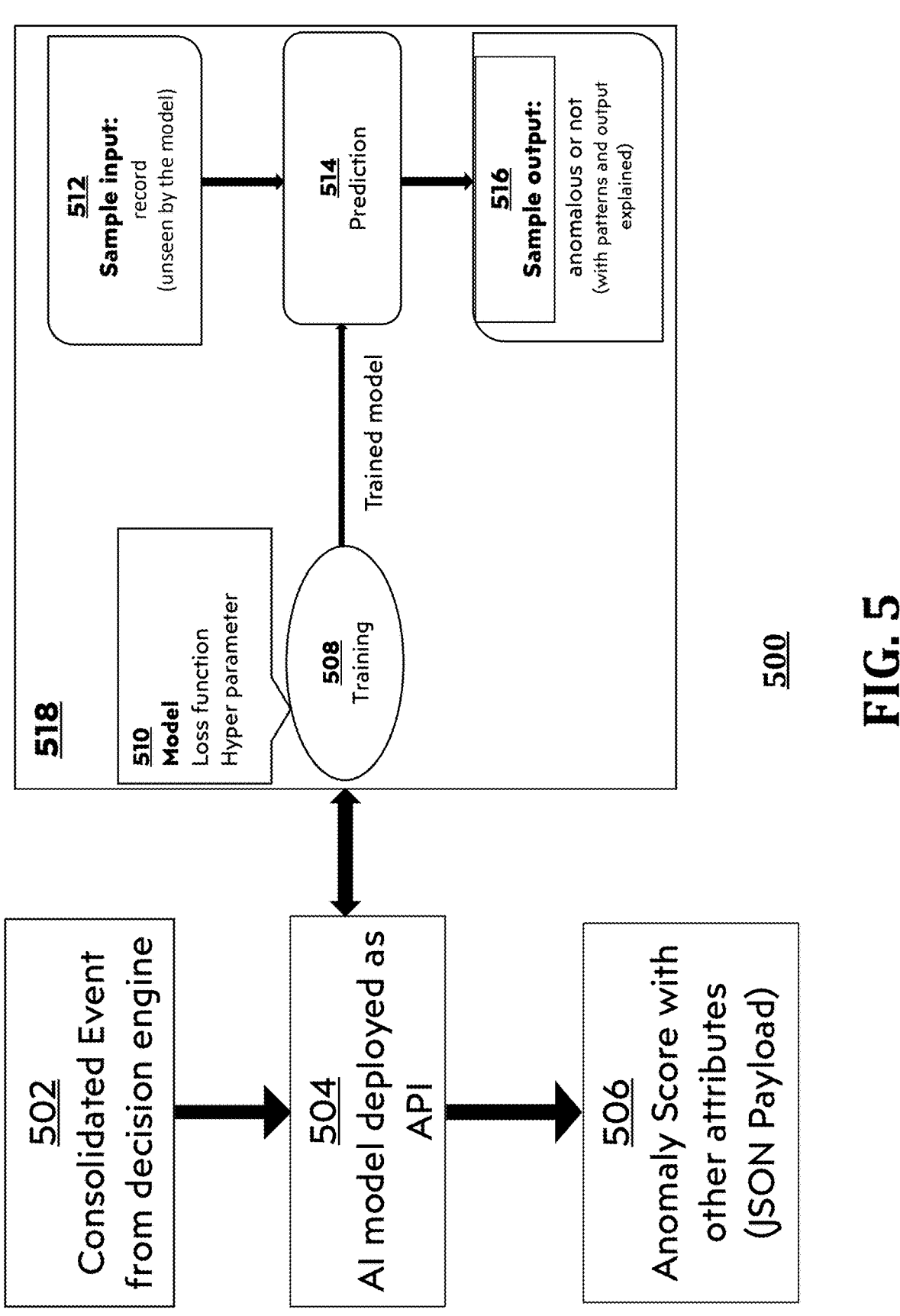
FIG. 5 depicts a flowchart of an exemplary process for a strategy updates recommendation engine.

FIG. 5 depicts a flowchart of an exemplary real-time process for a strategy updates recommendation engine 500 that determines a new resource network strategy or improvements to an existing resource network strategy. In FIG. 5, at block 502, a decision engine generates a consolidated event. In an embodiment, consolidated events may have been generated in response to receiving from a potential client a new client request to join a client network.

In response to the consolidated event, at block 504, one or more AI/ML model 518 is deployed as an application programming interface (API) to a host system of strategy updates recommendation engine 500. Each AI/ML model 518 that is deployed at block 504 has been trained 508 with at least one training dataset of client records and based on a particular learning model 510 that comprises at least one loss function and hyper parameter.

More particularly, each AI/ML model 518 that is deployed at block 504 has been trained 508 to: (1) receive an input record 512 that the AI/ML model has not seen before, and (2) predict 514 a likelihood of whether that record is anomalous or not. Accordingly, each AI/ML model 518 may output 516 a likelihood of whether a record is anomalous, any corresponding anomalous patterns, and an explanation of how the patterns contribute to the likelihood that the record is anomalous.

In an embodiment, an AI/ML model may utilize a "Large Margin Nearest Neighbor Metric Learning" and "Neighborhood Components Analysis" model according to the steps following listed in the following table 2.

TABLE 2

| Step | Step Detail | Outcomes | Frequency |
|---|---|---|---|
| 1 | Data Exploration & Cleaning | Data Integrity & Quality Checks | Real Time |
| 2 | Feature Engineering | Identifying the impacting attributes | Daily Once |
| 3 | Model Execution, Evaluation and Scoring | Model Execution & Scoring | Real Time |
| 4 | Identify & Report New Strategies for Manual Review | Strategy Team Validation & Integrating with Rules Engine | Weekly Once |

In this embodiment, during the data exploration and cleaning step, a decisioning engine may receive new requests to join a client network. On any given date, the decisioning engine may respectively receive as many as 2,677 or more such requests along with their corresponding records. A consolidated event may contain at many at 220 attributes such as new client request information, decision engine output, client information database, machine learning score, a list of resources currently available to a potential client, a record of the client's history resource consumption activities. Each new client request and its corresponding consolidated event may be assigned a queue.

In an exemplary embodiment, post analysis of a set of attributes may reveal that 15 of those attributes impact/contribute to a likelihood that the consolidated event pertains to an anomaly, and those 15 attributes may then be utilized to determine the anomaly's likelihood.

During the feature engineering step, a feature may be selected from each correlated n-tuple based upon its correlation with an output. Examples of highly correlated features include, a monthly total resource amount, disposable resources, ability to acquire resources, etc. Under such circumstances, the monthly total resource amount feature may be selected because it has the most correlation with the output.

During the model execution, evaluation and scoring step, data frames may be classified as either accepted or not accepted, then random samples may be selected for training in a 1:1 ratio. By utilizing Neighborhood Components Analysis (NCA), an average for the accepted and the non-accepted class within a vector space may be determined after applying a learned linear transform.

The model execution, evaluation and scoring step may also test anomaly samples by determining distances and calculating Anomaly Strength Scores, which may be predicted by utilizing logistic regression.

As per the methodology presented herein, the underlying assumption is that there are similarities between data points that should be rejected by a decision engine. Therefore, a learning model may be utilized to uncover these similarities, for example, a metric learning paradigm may be utilized to capture a dataset's similarities and differences.

As presented herein, feature engineering refers to a selection of a subset of features that are selected based on criteria that determine which feature(s) among a set of features most closely correlate(s) to a potential client's integrity. Hence, some embodiments may rely upon feature engineering as an alternative to relying upon a rules engine to process output.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for implementing a client network expansion tool, the method comprising:

converting at least one from among a first rule and a first trend into a first set of code that comprises at least a first corresponding programmatic client network strategy;

storing the first corresponding programmatic client network strategy within a first repository of strategies for a first client network that receives a first set of services from a first set of servers, wherein the first client network includes at least one client device;

receiving, from a new client, a first request to join the first client network, wherein the first request is associated with a new set of client details that correspond to the new client;

deploying at least one first application programming interface (API) of at least one first artificial intelligence and machine learning (AI/ML) model;

based on the first repository of strategies, utilizing, via the at least one first API, the at least one first AI/ML model to transform the new set of client details into at least one new quantification of a first set of client attributes;

utilizing, via the at least one first API, the at least one first AI/ML model to determine whether the at least one new quantification meets a first set of criteria for the first client network; and when a determination is made that the at least one new quantification meets the first set of criteria, adding the new client to the first client network.

2. The method of claim 1, after the adding the new client to the first client network, the method further comprises:

permitting, by the adding, the first set of servers to provide the first set of services to the new client; and improving, by the adding, a robustness of the first client network.

3. The method of claim 1, wherein when a determination is made that at least one new quantification does not meet the first set of criteria, the method further comprises:

rejecting the first request;

preventing, by the rejecting, the first set of servers from providing the first set of services to the new client; and protecting, by the rejecting, a robustness of the first client network from being diminished.

4. The method of claim 1, further comprising:

searching a set of databases for at least one from among at least one attribute value of the new client and at least one parameter value of the new client;

obtaining, from the set of databases, results of the searching, wherein the new set of client details comprises the results of the searching; and associating the new set of client details with the new client.

5. The method of claim 4, wherein the set of databases comprises at least one from among a government database and a database of an external agency.

6. The method of claim 1, wherein the transforming comprises utilizing an algorithm to transform the new set of client details into the at least one new quantification.

7. The method of claim 1, further comprising:

receiving a second request, wherein the second request is associated with a second set of client details, wherein the second request comprises a request to join a second client network that receives a second set of services from a second set of servers;

based on a second repository of strategies, transforming the second set of client details into at least one second quantification, wherein the at least one second quantification comprises at least one quantification of a second set of client attributes;

determining whether the at least one second quantification meets a second set of criteria for the second client network; and when a determination is made that the at least one second quantification meets the second set of criteria, granting the second request.

8. The method of claim 1, wherein the at least one first AI/ML model comprises at least one from among at least one explainable AI/ML model and at least one distance metric learning AI/ML model.

9. The method of claim 8, wherein the at least one explainable AI/ML model identifies a first set of contributing factors that cause the at least one first AI/ML model to transform the new set of client details into the at least one new quantification.

10. The method of claim 8, wherein the at least one distance metric learning AI/ML model is based on at least one from among a large margin nearest neighbor metric learning (LMNN) algorithm and a neighborhood components analysis (NCA) algorithm.

11. A system for implementing a client network expansion tool, the system comprising:

a processor; and memory storing instructions that, when executed by the processor, cause the processor to perform operations comprising:

converting at least one from among a first rule and a first trend into a first set of code that comprises at least a first corresponding programmatic client network strategy;

storing the first corresponding programmatic client network strategy within a first repository of strategies for a first client network that receives a first set of services from a first set of servers, wherein the first client network includes at least one client device;

receiving, from a new client, a first request to join the first client network, wherein the first request is associated with a new set of client details that correspond to the new client;

deploying at least one first application programming interface (API) of at least one first artificial intelligence and machine learning (AI/ML) model;

based on the first repository of strategies, utilizing, via the at least one first API, the at least one first AI/ML model to transform the new set of client details into at least one new quantification of a first set of client attributes;

utilizing, via the at least one first API, the at least one first AI/ML model to determine whether the at least one new quantification meets a first set of criteria for the first client network; and when a determination is made that the at least one new quantification meets the first set of criteria, adding the new client to the first client network.

12. The system of claim 11, after the adding the new client to the first client network, the instructions may cause the processor to perform further operations comprising:

permitting, by the adding, the first set of servers to provide the first set of services to the new client; and improving, by the adding, a robustness of the first client network.

13. The system of claim 11, wherein when a determination is made that at least one new quantification does not meet the first set of criteria, the instructions cause the processor to perform further operations comprising:

rejecting the first request;

preventing, by the rejecting, the first set of servers from providing the first set of services to the new client; and protecting, by the rejecting, a robustness of the first client network from being diminished.

14. The system of claim 11, wherein when executed, the instructions cause the processor to perform further operations comprising:

searching a set of databases for at least one from among at least one attribute value of the new client and at least one parameter value of the new client;

obtaining, from the set of databases, results of the searching, wherein the new set of client details comprises the results of the searching; and associating the new set of client details with the new client.

15. The system of claim 11, wherein when executed by the processor, the at least one first AI/ML model comprises at least one from among a distance metric learning AI/ML model and an explainable AI/ML model that identifies a first set of contributing factors that cause the at least one first AI/ML model to transform the new set of client details into the at least one new quantification, and wherein the at least one distance metric learning AI/ML model is based on at least one from among a large margin nearest neighbor metric learning (LMNN) algorithm and a neighborhood components analysis (NCA) algorithm.

16. A non-transitory computer-readable medium for implementing a client network expansion tool, the computer-readable medium stores instructions that, when executed by a processor, cause the processor to perform operations comprising:

converting at least one from among a first rule and a first trend into a first set of code that comprises at least a first corresponding programmatic client network strategy;

storing the first corresponding programmatic client network strategy within a first repository of strategies for a first client network that receives a first set of services from a first set of servers, wherein the first client network includes at least one client device;

receiving, from a new client, a first request to join the first client network, wherein the first request is associated with a new set of client details that correspond to the new client;

deploying at least one first application programming interface (API) of at least one first artificial intelligence and machine learning (AI/ML) model;

based on the first repository of strategies, utilizing, via the at least one first API, the at least one first AI/ML model to transform the new set of client details into at least one new quantification of a first set of client attributes;

utilizing, via the at least one first API, the at least one first AI/ML model to determine whether the at least one new quantification meets a first set of criteria for the first client network; and when a determination is made that the at least one new quantification meets the first set of criteria, adding the new client to the first client network.

17. The computer-readable medium of claim 16, after the adding the new client to the first client network, the instructions cause the processor to perform further operations that comprise:

permitting, by the adding, the first set of servers to provide the first set of services to the new client; and improving, by the adding, a robustness of the first client network.

18. The computer-readable medium of claim 16, wherein when a determination is made that at least one new quantification does not meet the first set of criteria, the instructions cause the processor to perform further operations comprising:

rejecting the first request;

preventing, by the rejecting, the first set of servers from providing the first set of services to the new client; and protecting, by the rejecting, a robustness of the first client network from being diminished.

19. The computer-readable medium of claim 16, wherein when executed by the processor, the instructions cause the transforming and the determining to be performed by at least one first artificial intelligence and machine learning (AI/ML) model that comprises at least one from among a distance metric learning AI/ML model and an explainable AI/ML model that identifies a first set of contributing factors that cause the at least one first AI/ML model to transform the new set of client details into the at least one new quantification.

20. The computer-readable medium of claim 19, wherein when executed by the processor, the instructions cause the at least one distance metric learning AI/ML model to be based on at least one from among a large margin nearest neighbor metric learning (LMNN) algorithm and a neighborhood components analysis (NCA) algorithm.

* * * * *